(12) United States Patent
Butler

(10) Patent No.: US 12,162,611 B2
(45) Date of Patent: Dec. 10, 2024

(54) AIRCRAFT PROPULSION SYSTEM

(71) Applicant: ROLLS-ROYCE plc, London (GB)

(72) Inventor: Philip D. Butler, Ashbourne (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/935,269

(22) Filed: Sep. 26, 2022

(65) Prior Publication Data
US 2023/0120297 A1 Apr. 20, 2023

(30) Foreign Application Priority Data

Oct. 18, 2021 (GB) ...................................... 2114829

(51) Int. Cl.
| | |
|---|---|
| *B64D 27/10* | (2006.01) |
| *B64D 27/24* | (2024.01) |
| *B64D 33/08* | (2006.01) |
| *F02C 6/00* | (2006.01) |
| *H01M 8/04082* | (2016.01) |
| *H01M 8/04111* | (2016.01) |
| *H01M 8/04119* | (2016.01) |
| *H02K 7/18* | (2006.01) |
| *B64D 27/02* | (2006.01) |

(52) U.S. Cl.
CPC ............. *B64D 27/10* (2013.01); *B64D 27/24* (2013.01); *B64D 33/08* (2013.01); *F02C 6/00* (2013.01); *H01M 8/04111* (2013.01); *H01M 8/04141* (2013.01); *H01M 8/04164* (2013.01); *H01M 8/04201* (2013.01); *H02K 7/1823* (2013.01); *B64D 27/026* (2024.01); *H01M 2250/20* (2013.01)

(58) Field of Classification Search
CPC ........ B64D 27/10; B64D 27/24; B64D 33/08; B64D 2027/026; F02C 6/00; F02C 6/08; F02C 7/143; F02C 3/305; F02C 6/10; H01M 8/04111; H01M 8/04141; H01M 8/04164; H01M 8/04201; H01M 2250/20; H02K 7/1823; F05D 2260/211; F05D 2220/76; Y02T 50/60; Y02T 90/40; F02K 3/06
See application file for complete search history.

(56) References Cited

U.S. PATENT DOCUMENTS

| | | | |
|---|---|---|---|
| 6,296,957 B1 | 10/2001 | Graage | |
| 2006/0254255 A1 | 11/2006 | Okai et al. | |
| 2009/0293494 A1* | 12/2009 | Hoffjann | B64D 27/24 |
| | | | 60/718 |
| 2011/0011096 A1 | 1/2011 | Edwards et al. | |

OTHER PUBLICATIONS

European search report dated Mar. 23, 2023, issued in EP Patent Application No. 22196825.8.
Great Britain search report dated Jun. 24, 2022, issued in GB Patent Application No. 2114829.1.
European search report dated Oct. 4, 2023, issued in EP Patent Application No. 23184938.1.

* cited by examiner

*Primary Examiner* — Joseph Ortega

(57) ABSTRACT

An aircraft propulsion system comprises a gas turbine engine arranged to provide propulsive thrust and a fuel cell system having an air input port, the aircraft propulsion system being configured such that air from a compressor of the gas turbine engine is provided to the air input port during operation of the aircraft propulsion system. The fuel cell system is able to provide appreciable electrical power at altitude without the need for a dedicated compressor.

15 Claims, 5 Drawing Sheets

AIRCRAFT PROPULSION SYSTEM

CROSS-REFERENCE TO RELATED APPLICATIONS

This specification is based upon and claims the benefit of priority from United Kingdom patent application number GB 2114829.1 filed on Oct. 18, 2021, the entire contents of which is incorporated herein by reference.

BACKGROUND

Technical Field

The disclosure relates to aircraft propulsion systems.

Description of the Related Art

Gas turbine engines in various forms (turbojet, turbofan, turbo-prop etc) have been used for aircraft propulsion for several decades. In some cases, it may be beneficial for an aircraft to be additionally provided with a fuel cell system, either for providing additional thrust in conjunction with a propulsor driven by an electric motor, or for providing electrical power to auxiliary systems of an aircraft. Typically, such a fuel cell system in this application has an air input, as in the case of a proton-exchange (or polymer electrolyte) membrane (PEM) fuel cell system for example. However, operation of such a fuel cell system generally requires compressed air input, particularly at altitude, in order for sufficient electrical power to be produced, particularly where the fuel cell system is required to provide electrical power for a propulsor comprising an electric motor. However, inclusion of compressor incurs a significant weight penalty in addition to requiring power input to drive the compressor. The overall power output/weight performance of such a fuel cell system may preclude its inclusion within certain aircraft.

SUMMARY

According to a first aspect of the present disclosure, an aircraft propulsion system comprises a gas turbine engine arranged to provide propulsive thrust and a fuel cell system having an air input port, the aircraft propulsion system being configured such that air from a compressor of the gas turbine engine is provided to the air input port of the fuel cell system during operation of the aircraft propulsion system. In operation of the aircraft propulsion system, compressed air derived from the compressor of the gas turbine engine is provided to the fuel cell system avoiding the need for the fuel cell system to include a dedicated compressor.

If the fuel cell system produces gaseous output comprising water vapour at an output port thereof during operation (as in the case of a PEM fuel cell system for example), preferably the aircraft propulsion system comprises a condenser coupled to the output port and arranged to condense water vapour in the gaseous output to produce liquid water, the aircraft propulsion system being configured to provide at least a portion of the liquid water to a combustor of the gas turbine engine to effect cooling of the combustor during operation of the aircraft propulsion system. By cooling the combustor of the gas turbine engine during operation, NOx emissions of the gas turbine engine are reduced. In addition, the turbine entry temperature of the gas turbine is reduced for a given fuel consumption rate, increasing turbine lifetime. Equivalently, a higher rate of fuel consumption is possible for a given turbine entry temperature.

The fuel cell system may be proton-exchange membrane (PEM) fuel cell system, the aircraft propulsion system further comprising a humidifier arranged to receive at least a portion of the liquid water produced by the condenser and to humidify the air from the compressor prior to input thereof to the air input of the PEM fuel cell system. Thus, water output from the PEM fuel cell system may be used to humidify the PEM fuel cell system.

The aircraft propulsion system may be arranged such that at least a portion of air output from the condenser provides propulsive thrust in use of the aircraft propulsion system, for example by being provided to the core output flow of the gas turbine engine. Alternatively, at least a portion of air output from the condenser may be provided to a turbo-electric generator. Alternatively, air from the condenser and hydrogen output from a hydrogen output port of the fuel cell system may be provided to a burner, the burner being arranged to combust the hydrogen and provide resulting combustion products to a turbo-electric generator.

The air from the compressor may be the principal compressed air output of the compressor section of the gas turbine engine, the compressor section comprising the compressor, at least a portion of air output from the condenser being provided to the combustor in operation of the aircraft propulsion system.

The air from the compressor may be bleed air from the compressor. In this case, where the fuel cell system produces gaseous output comprising water vapour at an output port thereof, the aircraft propulsion system may further comprise a heat exchanger disposed between consecutive stages of the gas turbine engine and be arranged such that in operation thereof said gaseous output is provided to the heat exchanger in order to provide cooling of compressed air between said consecutive compressor stages. The efficiency of the compressor stage downstream of the heat exchanger is thereby increased. The aircraft propulsion system may be arranged such that gaseous output from the heat exchanger provides propulsive thrust, for example by being provided to the core output flow of the gas turbine engine.

The gas turbine engine may be a hydrogen-burning gas turbine engine, the fuel cell system being of a type using hydrogen and air as chemical inputs, the aircraft propulsion system further comprising a hydrogen storage system and a conveying system arranged to convey hydrogen from the hydrogen storage system to a hydrogen input port of the fuel cell system and to a combustor of the gas turbine engine. The fuel cell system may have a hydrogen output port, the conveying system being arranged to convey hydrogen from the hydrogen output port to the combustor of the gas turbine engine. The conveying system may be configured such that hydrogen is conveyed to the combustor of the gas turbine engine exclusively via the fuel cell system.

According to a second aspect of the disclosure, an aircraft propulsion system comprises a gas turbine engine arranged to provide propulsive thrust and a fuel cell system which produces gaseous output comprising water vapour at an output port thereof during operation of the aircraft propulsion system, the aircraft propulsion system further comprising a condenser coupled to the output port and arranged to condense water vapour in the gaseous output to produce liquid water, the aircraft propulsion system being configured to provide at least a portion of the liquid water to a combustor of the gas turbine engine to effect cooling of the combustor during operation of the aircraft propulsion system.

The aircraft propulsion system may comprise an electric motor arranged to drive a propulsor, the fuel cell system being arranged to provide electrical power to the electric motor during operation of the aircraft propulsion system.

A third aspect of the disclosure provides an aircraft comprising an aircraft propulsion system according to either the first aspect or the second aspect of the disclosure.

DESCRIPTION OF THE DRAWINGS

Embodiments of the disclosure are described below by way of example only and with reference to the accompanying drawings in which.

DETAILED DESCRIPTION

Figure 1:
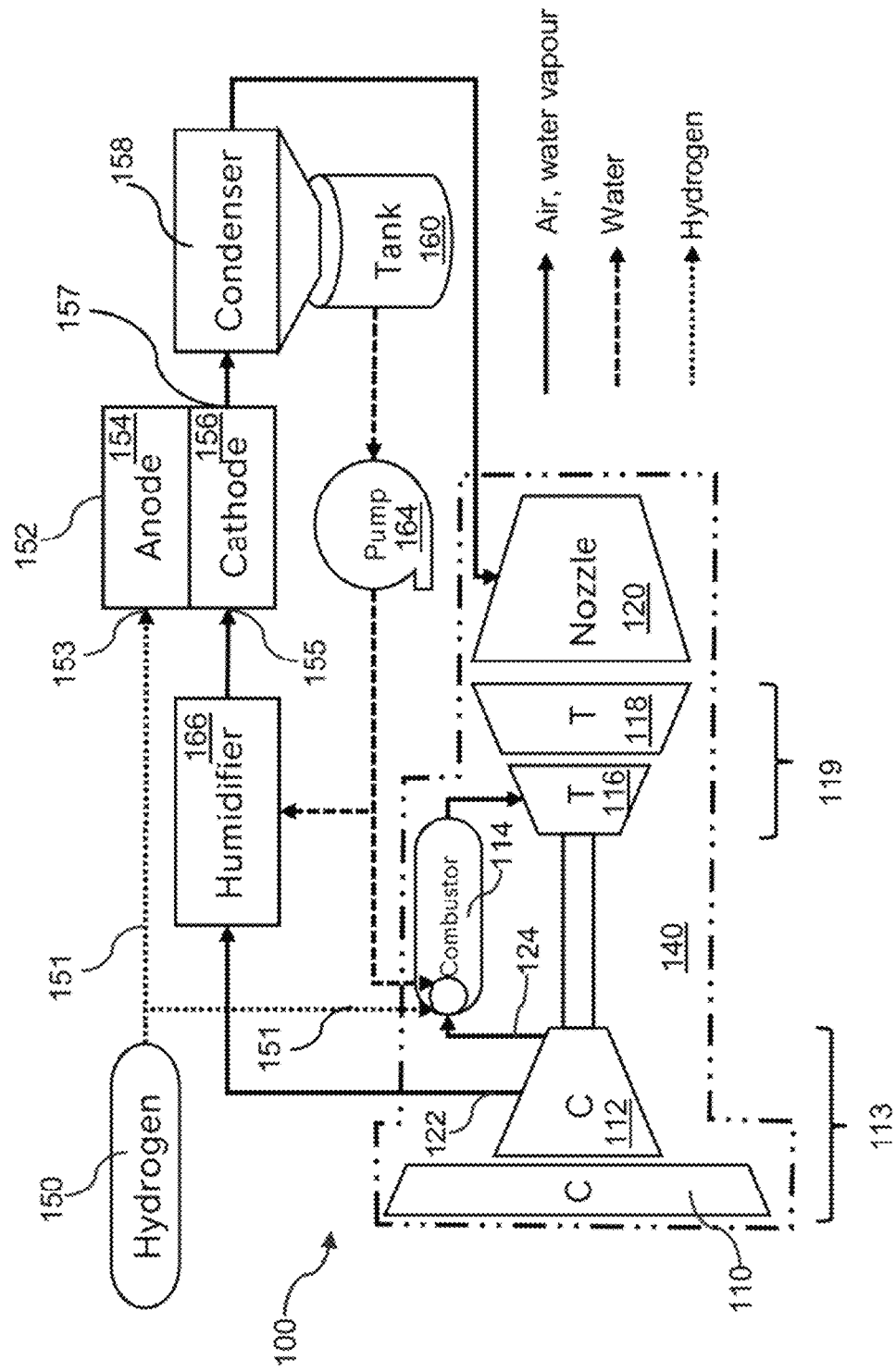
FIG. 1 is a diagrammatic view of a first embodiment of an aircraft propulsion system.

Referring to FIG. 1, a first example aircraft propulsion 100 comprises a proton exchange (or polymer electrolyte membrane (PEM) fuel cell system 152 and a hydrogen-burning gas turbine engine 140 each of which are provided with hydrogen fuel from a hydrogen storage system 150 via conveying system 151. Hydrogen storage system 150 may be a tank storing gaseous or liquid hydrogen, or some other type of storage system. The PEM fuel cell system 152 has a hydrogen input port 153, an air input port 155 and an output port 157 from which gaseous output comprising air and water vapour is produced during operation of the PEM fuel cell system 152. The hydrogen-burning gas turbine engine 140 comprises a compressor section 113 comprising low- and high-pressure compressors 110, 112, a turbine section 119 comprising high- and low-pressure turbines 116, 118, a core output nozzle 120 and a combustor 114. The gas turbine engine 140 may form the basis of turbofan, turbojet or turbo-prop engine.

In operation of the aircraft propulsion system 100, the principal air output 124 of the compressor section 113 and hydrogen fuel from the hydrogen storage system 150 are provided to the combustor 114. Bleed air 122 from the high-pressure compressor 112 is delivered to the air input port 155 of the PEM fuel cell system 152 via a humidifier 166 and hydrogen fuel is delivered to the hydrogen input port 153 of the PEM fuel cell system 152. The PEM fuel cell 152 operates in a known manner to provide electrical output power which may be used to drive a propulsor comprising an electric motor, thus contributing to the thrust of the aircraft propulsion system 100, or for other purposes. Gaseous output comprising air and water vapour is expelled at the output port 157 of the PEM fuel cell system 152 and provided to a condenser 158 which provides liquid water to a tank 160. A pump 164 pumps liquid water from the tank 160 to the humidifier 166 and to the combustor 114. The combustor 114 is thereby cooled, reducing NOx emissions and lowering the turbine entry temperature (TET) to the turbine section 119 for a given rate of hydrogen combustion, thus increasing the lifetimes of the turbines 116, 118. (Alternatively, the hydrogen combustion rate may be increased for a given TET). Air output from the condenser 158 is provided to the core output nozzle 120 of the gas turbine engine 140, thus contributing to the core output flow of the gas turbine engine 140 and increasing the thrust produced by the aircraft propulsion system 100.

Figure 2:
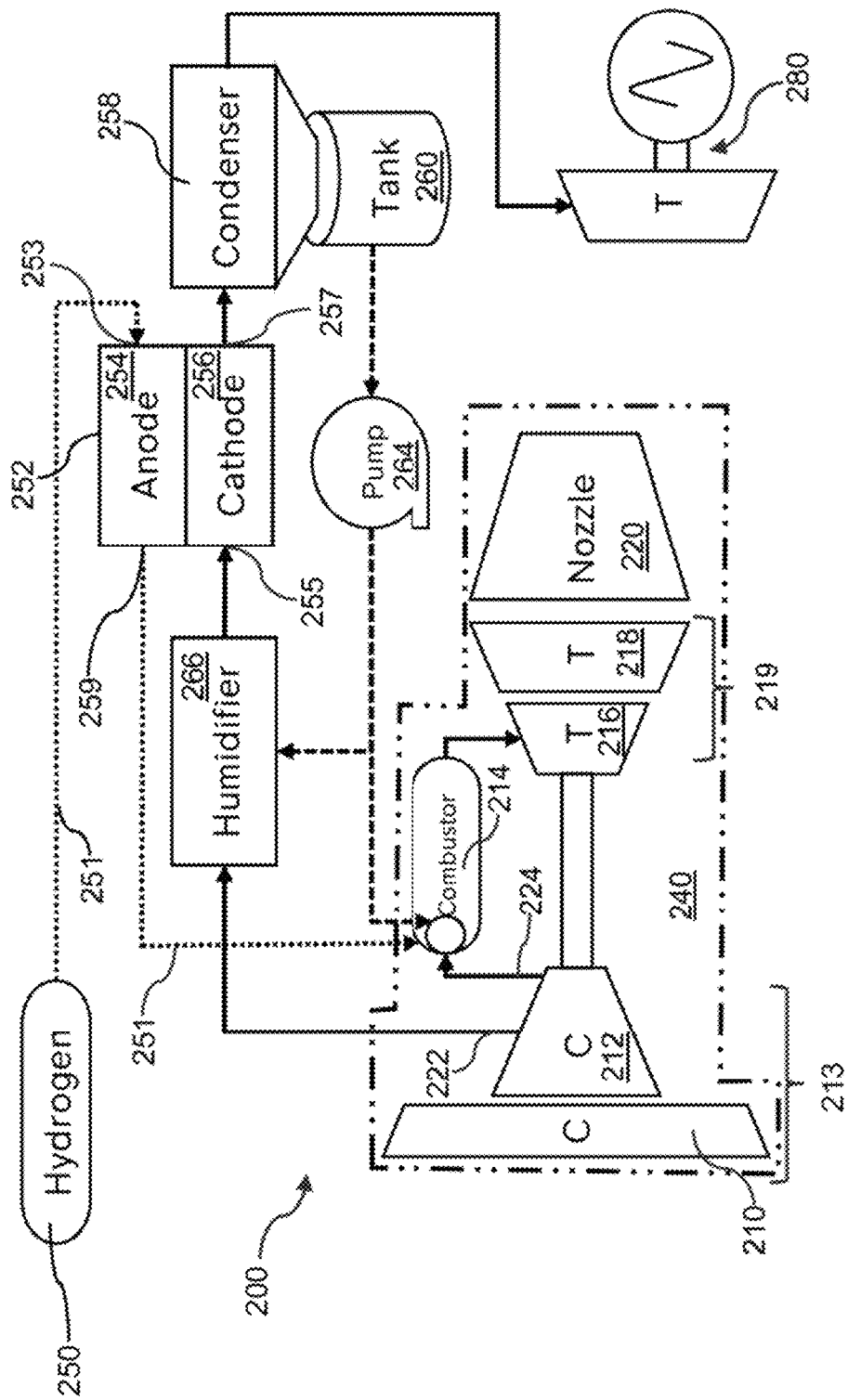
FIG. 2 is a diagrammatic view of a second embodiment of an aircraft propulsion system.

FIG. 2 shows a second embodiment of an aircraft propulsion system 200. Parts of the system 200 which correspond to parts of the system 100 of FIG. 1 are labelled with reference numerals which differ by 100 from those labelling the corresponding parts in FIG. 1. The aircraft propulsion system 200 comprises a PEM fuel cell system 252 having hydrogen input and output ports 253, 259. A conveying system 251 couples a hydrogen fuel storage system 250 to the hydrogen input port 253, and the hydrogen output port 259 to a combustor 214 of gas turbine engine 240. Thus, hydrogen fuel is provided to the gas turbine engine 240 via the PEM fuel cell system 252. Air output from condenser 258 is provided to a turbo-electric generator 280 which generates electrical power, for example for aircraft auxiliary systems or for other purposes. Water collected in tank 260 is pumped by pump 264 to humidifier 266 in order to humidify air input to PEM fuel cell system 252 and to cool a combustor 214 of gas turbine engine 240.

Figure 3:
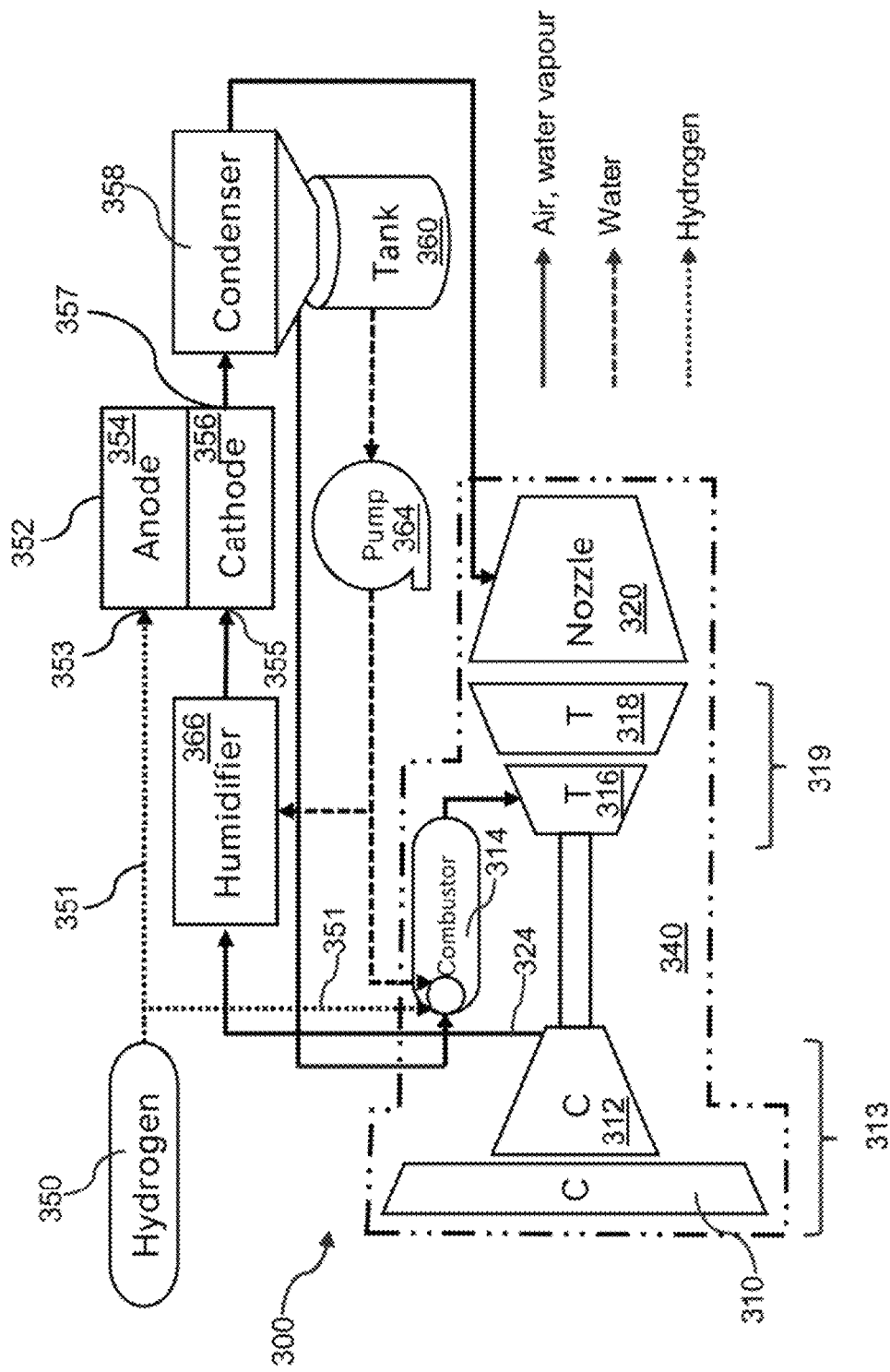
FIG. 3 is a diagrammatic view of a third embodiment of an aircraft propulsion system.

FIG. 3 shows a third embodiment of an aircraft propulsion system 300. Parts of the system 300 which correspond to parts of the system 100 of FIG. 1 are labelled with reference numerals which differ by 200 from those labelling the corresponding parts in FIG. 1. In the aircraft propulsion system 300, output air 324 from high-pressure compressor 312 is the principal compressed air output of compressor section 313 and is provided to air input 355 of PEM fuel cell system 352 via humidifier 366. A portion of air output from condenser 358 is provided to combustor 314 of gas turbine engine 340, the remainder being provided to core output nozzle 320 of gas turbine engine 340 and contributing to the core output flow of the engine 340. Air provided to combustor 314 is therefore provided exclusively via PEM fuel cell system 352.

Figure 4:
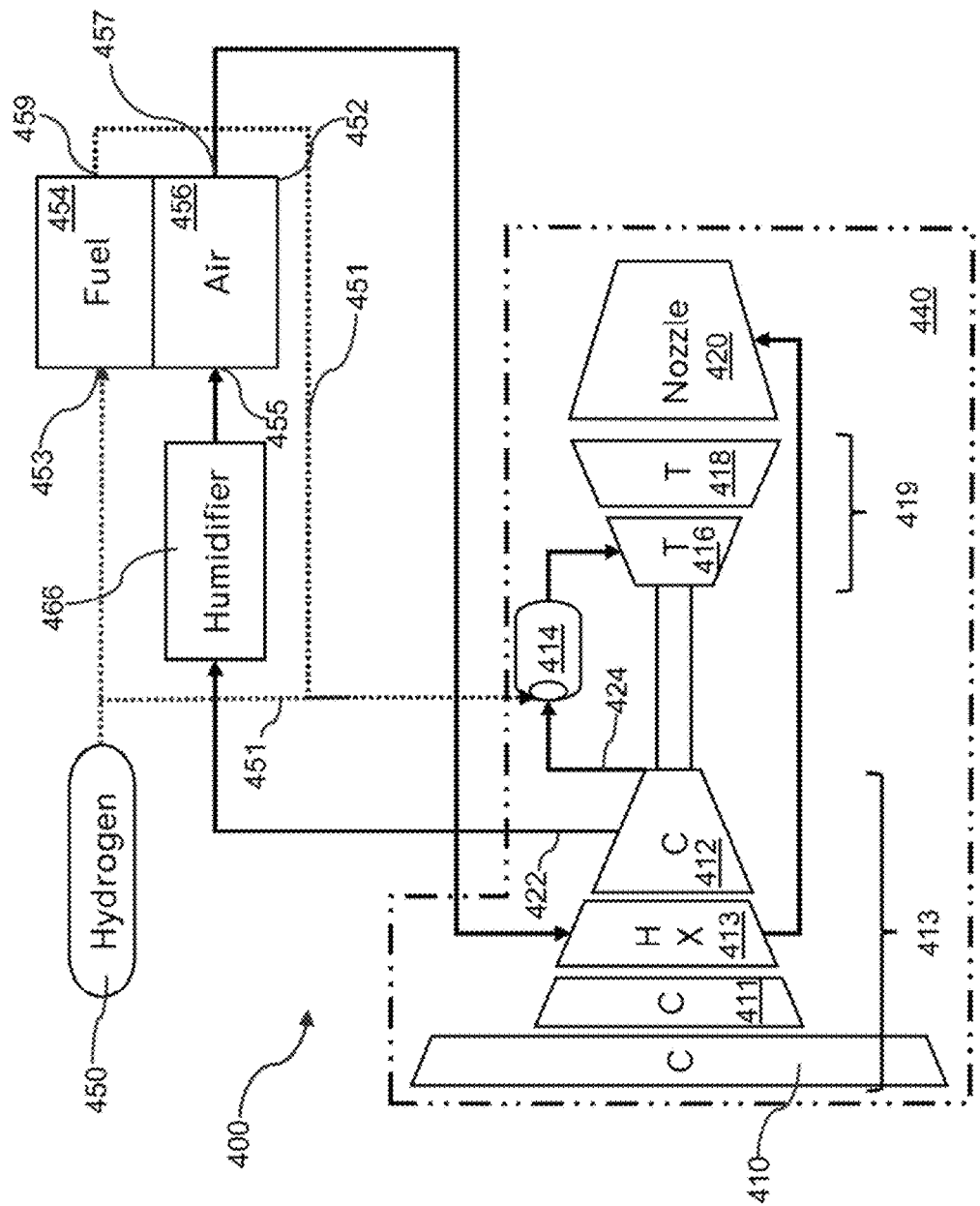
FIG. 4 is a diagrammatic view of a fourth embodiment of an aircraft propulsion system.

FIG. 4 shows a fourth embodiment of an aircraft propulsion system 400. Parts of the system 400 which correspond to parts of the system 100 of FIG. 1 are labelled with reference numerals which differ by 300 from those labelling the corresponding parts in FIG. 1. The aircraft propulsion system 400 comprises a hydrogen-burning gas turbine engine 440 and a PEM fuel cell system 452. In operation of the aircraft propulsion system 400, bleed air from high-pressure compressor 412 is provided to air input port 455 of the PEM fuel cell system 452 via humidifier 466, the principal compressed air output of the compressor section 413 being provided to combustor 414. Hydrogen fuel from hydrogen storage system 450 is provided to the combustor 414 and to hydrogen input port 453 of PEM fuel cell system 452. Additionally, hydrogen is conveyed by conveying system 451 from hydrogen output port 459 of PEM fuel cell 452 to combustor 414. A heat exchanger 413 located between the intermediate- and high-pressure compressors 411, 412 is arranged to receive gaseous output comprising air and water vapour from output port 457 of PEM fuel cell system 452. Air passing from the intermediate compressor 411 to the high-pressure compressor 413 is cooled by the heat exchanger 413, increasing the efficiency of the high-pressure compressor 412. Gaseous output from the heat exchanger is provided to core output nozzle of gas turbine engine 440, contributing to the core output flow of engine 440 and contributing to the thrust produced by the propulsion system 400.

Figure 5:
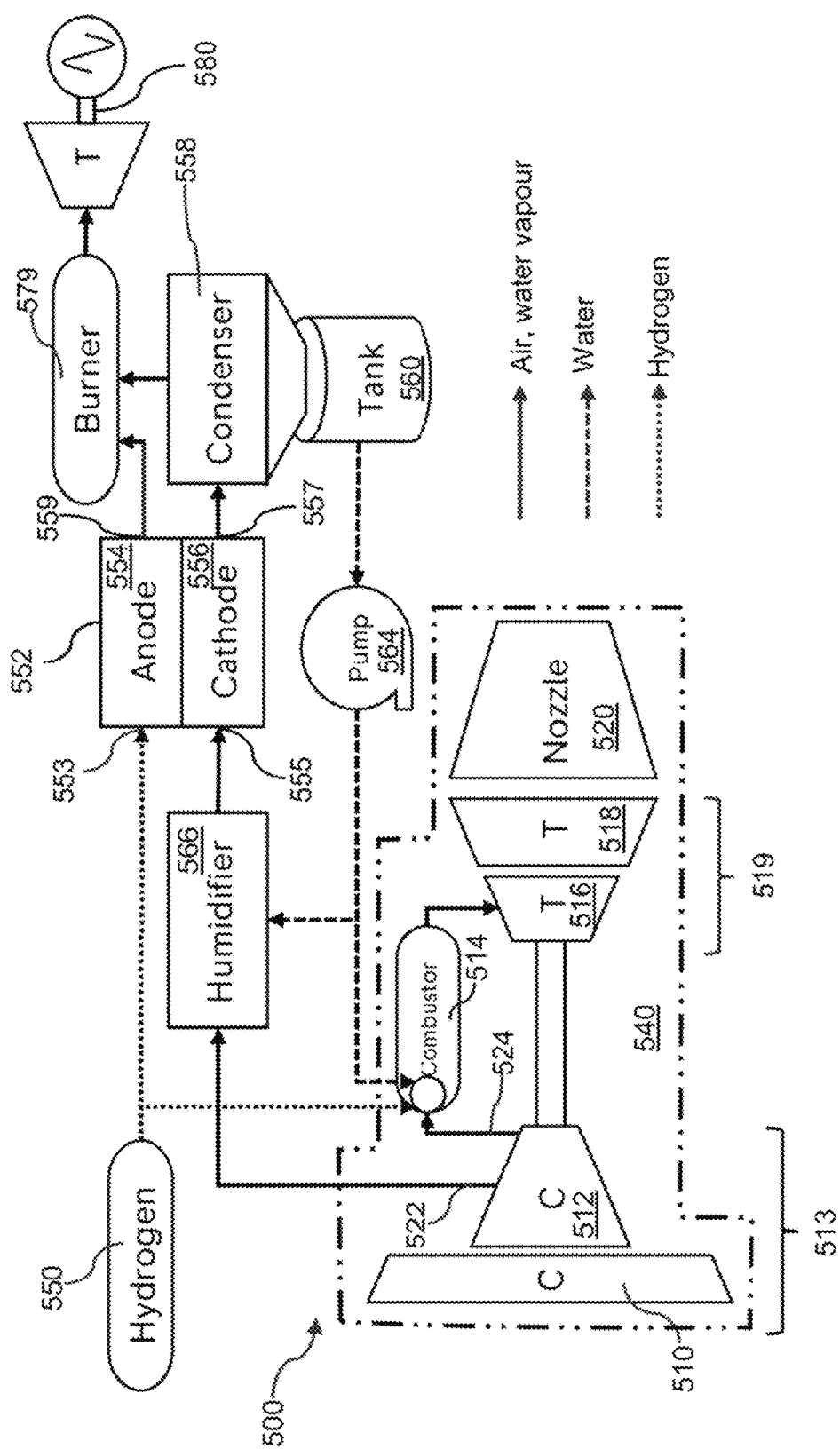
FIG. 5 is a diagrammatic view of a fifth embodiment of an aircraft propulsion system.

FIG. 5 shows a fifth example aircraft propulsion system 500. Parts of the system 500 which correspond to parts of the system 100 of FIG. 1 are labelled with reference numerals which differ by 400 from those labelling the corresponding parts in FIG. 1. The aircraft propulsion system 500 comprises a gas turbine engine 540 arranged to provide propulsive thrust and PEM fuel cell system 552. During operation of the system 500, bleed air from high-pressure compressor 512 is provided to air input 555 of PEM fuel cell system 552 via humidifier 566. Gaseous output from PEM fuel cell 552 comprises air and water vapour and is provided to condenser 558. Condensed water from condenser 558 is provided to tank 560 and pumped by pump 564 to combustor 514 and humidifier 566. Air output from condenser 558 and hydrogen fuel output from hydrogen output 559 of the PEM fuel cell system 552 are provided a burner 579. Combustion products output from burner 579 are provided to a turbine of turbo-electric generator 580 which provides electrical power output, for example for auxiliary systems of an aircraft comprising the aircraft propulsion system 500.

The invention claimed is:

1. An aircraft propulsion system comprising a gas turbine engine arranged to provide propulsive thrust and a fuel cell system having an air input port, wherein the aircraft propulsion system further comprises a humidifier and is configured such that air from a compressor of the gas turbine engine is provided through the humidifier to the air input port of the fuel cell system during operation of the aircraft propulsion system,
    wherein in operation thereof the fuel cell system produces gaseous output comprising water vapour at an output port of the fuel cell system, the aircraft propulsion system comprises a condenser coupled to the output port and arranged to condense water vapour in the gaseous output to produce liquid water and the aircraft propulsion system is configured to provide at least a portion of the liquid water to a combustor of the gas turbine engine to effect cooling of the combustor during operation of the aircraft propulsion system, and
    wherein the fuel cell system is a proton-exchange membrane or polymer electrolyte membrane (PEM) fuel cell system and the humidifier is arranged to receive at least a portion of the liquid water produced by the condenser through a pump and to humidify the air from the compressor prior to input thereof to the air input port of the PEM fuel cell system.

2. The aircraft propulsion system according to claim 1, and arranged such that at least a portion of air output from the condenser provides propulsive thrust in use of the aircraft propulsion system.

3. The aircraft propulsion system according to claim 2, wherein at least a portion of air output from the condenser is provided to the core output flow of the gas turbine engine during operation of the aircraft propulsion system.

4. The aircraft propulsion system according to claim 1, comprising a turbo-electric generator, the aircraft propulsion system being configured such that at least a portion of air output from the condenser is provided to the turbo-electric generator in operation of the aircraft propulsion system.

5. The aircraft propulsion system according to claim 1, comprising a burner and a turbo-electric generator, the burner being arranged to receive air from the condenser and hydrogen from a hydrogen output port of the fuel cell system and to combust the hydrogen and provide resulting combustion products to the turbo-electric generator.

6. The aircraft propulsion system according to claim 1, wherein said air from the compressor is the principal compressed air output of the compressor section of the gas turbine engine, the compressor section comprising the compressor, and wherein at least a portion of air output from the condenser is provided to the combustor in operation of the aircraft propulsion system.

7. The aircraft propulsion system according to claim 1, wherein said air from the compressor is bleed air from the compressor.

8. The aircraft propulsion system according to claim 7, comprising a heat exchanger disposed between consecutive compressor stages of the gas turbine engine and wherein in operation of the aircraft propulsion system the fuel cell system produces gaseous output comprising water vapour at an output port thereof, the aircraft propulsion system being arranged such that in operation thereof said gaseous output is provided to the heat exchanger to provide cooling of compressed air between said consecutive compressor stages.

9. The aircraft propulsion system according to claim 8, configured such that gaseous output from the heat exchanger provides propulsive thrust during operation of the aircraft propulsion system.

10. The aircraft propulsion system according to claim 9, wherein gaseous output from the heat exchanger is provided to the core output flow of the gas turbine engine during operation of the aircraft propulsion system.

11. The aircraft propulsion system according to claim 1, wherein the gas turbine engine is a hydrogen-burning gas turbine engine and the fuel cell system has a hydrogen input port, the aircraft propulsion system further comprising a hydrogen storage system and a conveying system arranged to convey hydrogen from the hydrogen storage system to the hydrogen input port of the fuel cell system and to a combustor of the gas turbine engine.

12. The aircraft propulsion system according to claim 11, wherein the fuel cell system has a hydrogen output port and the conveying system is arranged to convey hydrogen from the hydrogen output port to the combustor of the hydrogen-burning gas turbine engine.

13. The aircraft propulsion system according to claim 12, wherein the conveying system is arranged to convey hydrogen to the combustor of the hydrogen-burning gas turbine engine exclusively via the fuel cell system.

14. The aircraft propulsion system according to claim 1 further comprising an electric motor arranged to drive a propulsor, the fuel cell system being arranged to provide electrical power to the electric motor during operation of the aircraft propulsion system.

15. An aircraft comprising the aircraft propulsion system according to claim 1.

* * * * *